US010341019B1

(12) United States Patent
Blanks

(10) Patent No.: US 10,341,019 B1
(45) Date of Patent: *Jul. 2, 2019

(54) M-ARY FREQUENCY PRESENCE MODULATION COMMUNICATION SYSTEM AND METHOD FOR DEEP SPACE

(71) Applicant: BOOZ ALLEN HAMILTON INC., McLean, VA (US)

(72) Inventor: Keith A. Blanks, Colorado Springs, CO (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,510

(22) Filed: Jun. 26, 2018

(51) Int. Cl.
*H04B 10/00* (2013.01)
*H04B 10/118* (2013.01)
(Continued)

(52) U.S. Cl.
CPC .......... *H04B 10/118* (2013.01); *G02B 6/102* (2013.01); *G02B 6/105* (2013.01); *G02B 6/322* (2013.01); *G02B 6/3534* (2013.01)

(58) Field of Classification Search
CPC .............. H04B 10/112; H04B 10/1121; H04B 10/1123; H04B 10/1125; H04B 10/1129;
(Continued)

(56) References Cited

U.S. PATENT DOCUMENTS

| 6,920,290 B2 * | 7/2005 | Mitra | H01S 3/2383 398/202 |
| 7,127,168 B2 * | 10/2006 | Kani | H04B 10/506 398/79 |

(Continued)

OTHER PUBLICATIONS

Berman, Gennady, et al., "Suppression of intensity fluctuations in free space high-speed optical communication based on spectral encoding of a partially coherent beam", Science Direct, Optics Communications, Aug. 27, 2007, pp. 264-270, vol. 280.
(Continued)

*Primary Examiner* — Hanh Phan
(74) *Attorney, Agent, or Firm* — Buchanan Ingersoll & Rooney PC

(57) ABSTRACT

An optical communication system that includes a data transmitter which includes: at least one ultraviolet laser source configured to output ultraviolet light energy as an optical beam having an operating bandwidth with at least one communication band; a frequency presence modulation unit including at least one optical component having an ultraviolet coating, the frequency presence modulation unit being configured to: spectrally segregate the bandwidth of the at least one communication band into plural channels, and modulate the bandwidth to selectively produce an ultraviolet optical output signal with wavelengths that correspond to one or more of the channels, wherein a presence and absence of energy within channels of the communication band will constitute an information packet for data communication; and a controller for providing a control signal to the frequency presence modulation unit to spectrally segregate the bandwidth of the at least one communication band into the plural channels.

27 Claims, 13 Drawing Sheets

(51) Int. Cl.
  *G02B 6/10* (2006.01)
  *G02B 6/35* (2006.01)
  *G02B 6/32* (2006.01)

(58) Field of Classification Search
  CPC .............. H04B 10/114; H04B 10/1141; H04B 10/1143; H04B 10/1149; H04B 10/548; H04B 10/506; H04B 10/516; H04J 14/02
  USPC ....... 398/118, 119, 120, 121, 122, 124, 125, 398/126, 127, 128, 129, 130, 131, 183, 398/188, 193, 194, 195, 196, 201, 202, 398/186, 187, 79, 135, 136, 158, 159; 359/237, 238, 245, 248, 279
  See application file for complete search history.

(56) References Cited

U.S. PATENT DOCUMENTS

| | | | |
|---|---|---|---|
| 8,031,391 B2* | 10/2011 | Bartlett | G02B 6/2931 359/223.1 |
| 8,144,321 B2* | 3/2012 | Duncan | G01J 3/02 356/310 |
| 10,050,715 B1* | 8/2018 | Blanks | H04B 10/5563 |
| 2018/0191446 A1* | 7/2018 | Blanks | G02B 27/283 |

OTHER PUBLICATIONS

Berman, Gennady, et al., "High Data-rate, Free-space Laser Communication Based on Frequency Encoding of a Partially Coherent Beam", Los Alamos National Laboratory, Associate Directorate for Theory, Simulation, and Computation (ADTSC) LA-UR-09-01756, pp. 98-99, Dec. 4, 2008.

Yamanaka, Chihiro, et al., "Development of a terawatt coherent white light lidar system and applications to environmental studies", Multispectral, Hyperspectral, and Ultraspectral Remote Sensing Technology, Techniques, and Applications II, Proc. of SPIE vol. 7149, 71490Z (2008), doi: 10.1117/12.806415, pp. 1-8.

* cited by examiner

M-ARY FREQUENCY PRESENCE MODULATION COMMUNICATION SYSTEM AND METHOD FOR DEEP SPACE

FIELD

The present disclosure relates to a communication system and method that uses M-ARY frequency presence modulation.

BACKGROUND

Existing satellite laser communications systems utilize narrow bandwidth (<2 nanometer) sources and modulation techniques, such as Binary Phase Shift Keying (BPSK) for the extant European Data Relay System (EDRS), and Differential Phase Shift Keying (DPSK) for NASA's Laser Communication Relay Demonstration (LCRD). These systems rely on the speed of phase shifting near infrared telecommunications electronics for data encoding, not the available bandwidth of the source.

A paper entitled "Suppression of intensity fluctuations in free space high-speed optical communication based on spectral encoding of a partially coherent beam" in Science Direct, Optics Communications 280, August 2007, pages 264-270, by Gennady P. Berman et al. describes a free space, high-speed (Gbps) optical communication system based on spectral encoding of radiation from a broadband pulsed laser. This paper describes that scintillations can be suppressed by orders of magnitude for distances of more than 10 km with the use of partially coherent laser beams and a relatively slow photosensor.

A paper entitled "High Data-rate, Free-space Laser Communication Based on Frequency Encoding of a Partially Coherent Beam" by Gennady P. Berman et al., Los Alamos National Laboratory, describes a free-space, high-speed optical communication (FSOC) system based on spectral encoding of radiation from a broadband, pulsed laser. This paper proposes to extend a technique of scintillation suppression, based on time averaging of a partially coherent beam, to a gigabit data rate FSOC.

A paper entitled "Development of a terawatt coherent white light lidar system and applications to environmental studies" by Chihiro Yamanka et al., Multispectral, Hyperspectral, and Ultraspectral Remote Sensing Technology, Techniques, and Applications II, Proc. Of SPIE Vol. 7149, 71490Z, 2008, describes a white light lidar system which uses an intense femtosecond laser pulse and self-trapping in atmospheric-pressure of Kr gas to obtain multi-wavelength backscattering and depolarization profiles from aerosols and clouds.

SUMMARY

An exemplary embodiment of the present disclosure provides an optical communication system that includes a data transmitter. The data transmitter includes: at least one ultraviolet laser source configured to output ultraviolet light energy as an optical beam having an operating bandwidth with at least one communication band; a frequency presence modulation unit including at least one optical component having an ultraviolet coating, the frequency presence modulation unit being configured to: spectrally segregate the bandwidth of the at least one communication band into plural channels, and modulate the bandwidth to selectively produce an ultraviolet optical output signal with wavelengths that correspond to one or more of the channels, wherein a presence and absence of energy within channels of the communication band will constitute an information packet for data communication; and a controller for providing a control signal to the frequency presence modulation unit to spectrally segregate the bandwidth of the at least one communication band into the plural channels.

An exemplary embodiment of the present disclosure provides a method for optical communication, the method including: outputting ultraviolet light energy, from at least one ultraviolet laser source, as an optical beam having an operating bandwidth with at least one communication band; spectrally segregating a bandwidth of the at least one communication band into plural channels using a frequency presence modulation unit that includes at least one optical component having an ultraviolet coating; modulating the bandwidth to selectively produce an ultraviolet optical output signal with wavelengths that correspond to one or more of the channels, wherein a presence and absence of energy within channels of the communication band will constitute an information packet for data communication; and transmitting, by a transmission device, the ultraviolet optical output signal.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

Figure 1:
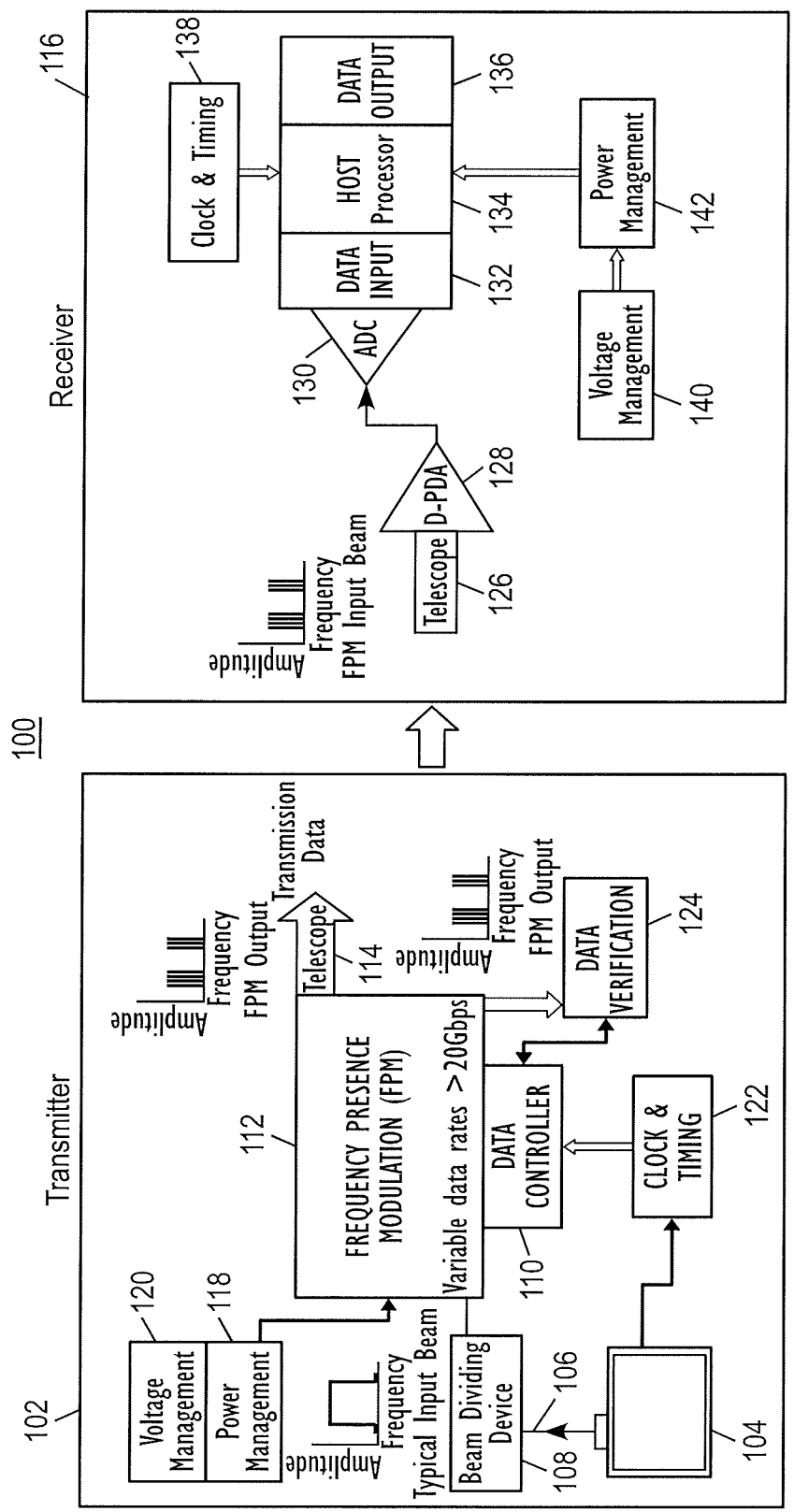
FIG. 1 is a block diagram illustrating a system hardware architecture in accordance with an exemplary embodiment.

The present disclosure is directed to an optical communication system that performs M-ary frequency presence modulation to capitalize on the available bandwidth of an optical emission device (i.e., laser, LED, etc.) to encode data for data transmission. In an exemplary embodiment, the optical communication system can be used for deep space communications, e.g., deep space ultra-wideband optical communications. Deep space is the space well outside the earth's atmosphere, and especially the part of space lying beyond the earth-moon system. Ultra-wideband is high-bandwidth communications, i.e. transmitting information spread over a bandwidth that is greater than 500 MHz. M-ary transmission is a type of digital modulation where instead of transmitting one bit at a time, two or more bits are transmitted simultaneously. M-ary is multilevel signaling communication where M=number of discrete signal or voltage levels, N=number of bits, and $M=2^N$. M-ary can be used to design a communication system that is bandwidth efficient. The transmitter considers 'N' bits at a time, and it produces one of M signals where $M=2^N$. This type of transmission results in reduced channel bandwidth. The optical communication system can achieve data transmission rates that are for example equal to or greater than 20 Gigabits per second (Gbps), and can transmit data over distances greater than 30 km (plus or minus ten percent) under nominal field conditions. Data can be transmitted over distances less than 30 km. Data rates can be validated using the 100 Gigabit Ethernet (100 GbE) standard.

The optical communication system can be used for terrestrial, airborne, space optical communications, and deep space optical communications for example. System and methods of the present disclosure use frequency presence modulation of the operating bandwidth of the optical emission device for very high data rate, variable data rate, or moderate date rate optical communications. M-ary frequency presence modulation enables very high throughput, and a single optical emission device results in more than a 50% reduction in size, weight, and power envelope compared to approaches using multiple optical emission devices. The M-ary frequency presence modulation schema uses a presence and absence of spectral content within the operating bandwidth of the optical emission device (i.e., the transmission source). For ultra-wide bandwidth emission sources (e.g., lasers, light emitting diodes, etc.), the spectral content of the optical emission device is first spectrally segregated into individual communication bands, followed by channelization of the spectral content within the band. Channel content is electronically and optically directed to, or removed from the transmission path. For narrow bandwidth optical emission devices, the functionality of the M-ary frequency presence modulation schema is unchanged from when an ultra-wide bandwidth optical emission device is used, although the electronic and optical components may differ from those used for ultra-wide bandwidth transmission.

The optical communication system of the present disclosure can be used as a free space optical (FSO) communications network. The benefits of a FSO communications network span every telecommunications mission that intends to leave Earth's atmosphere. The use of free space optical networks has been envisioned as a desirable alternative to radio based communications technology for a variety of reasons. Presently, free space optical networks do not compete for frequency space allocation. Optical communications are inherently more secure than radio based communications, have the side benefit of ranging an order of magnitude better than presently employed radio frequency tracking techniques, and offer reduced size, weight, and power burden.

FIG. 1 shows an optical communication system 100 in accordance with an exemplary embodiment. The optical communication system 100 includes a data transmitter 102 and a data receiver 116. The data transmitter 102 includes at least one optical emission device 104 configured to output light energy as an optical beam 106 having an operating bandwidth. For example, the at least one optical emission device can be an ultraviolet laser source configured to output ultraviolet light energy (e.g., the light spectrum from 10 nanometers to about 400 nanometers) as an optical beam having an operating bandwidth of anywhere between 200 nanometers to 450 nanometers. For example, a bandwidth of 300 nanometers. However, the bandwidth could be any nanometer range. In an exemplary embodiment, the ultraviolet laser source can emit light in the range from 100 nanometers to 390 nanometers. In an exemplary embodiment, the laser source can output ultraviolet light energy in addition to visible light energy (energy in the range of 390 nanometers to 700 nanometers). In an exemplary embodiment, the at least one optical emission device 104 can be, for example, an ultra-wide bandwidth (for example, greater than 1,000 nm) laser. In an exemplary embodiment, the at least one optical emission device 104 is a single optical emission device. In an exemplary embodiment, the optical emission device 104 is an ultraviolet laser source with approximately 300 nm of bandwidth (e.g., anywhere between 200 to 450 nm) per pulse and is un-polarized (i.e., contains both vertical and horizontal polarized light). The laser pulse repetition rate can be, for example, 60 MHz. However, any repetition rate can be used. In an exemplary embodiment, the at least one ultraviolet laser source has a continuum generation fiber that includes ultraviolet grade sapphire material. Ultraviolet grade sapphire material allows for continuum generation deeper into the ultraviolet spectrum than standard sapphire. Also, ultraviolet grade sapphire material has lower optical absorption properties in the ultraviolet region than standard sapphire. The sapphire material can be a synthetic sapphire material.

The data transmitter 102 also includes a beam dividing device 108 arranged to receive and divide the operating bandwidth of the optical beam 106 into plural communication bands. In an exemplary embodiment, the beam dividing device 108 is, for example, at least one spectral bandpass filter, etc. The ultra-wide bandwidth of the optical emission device 104 is spectrally separated into bands of a user defined bandwidth via the beam dividing device 108. In an exemplary embodiment, each of the plural communication bands has the same bandwidth. For example, if the optical emission device 104 is a laser with approximately 300 nm of bandwidth, a 100 nm spectral bandpass filter yields three independent bands each having 100 nm bandwidth, a 50 nm spectral bandpass filter yields six independent bands each having 50 nm bandwidth, etc.

Figure 7:
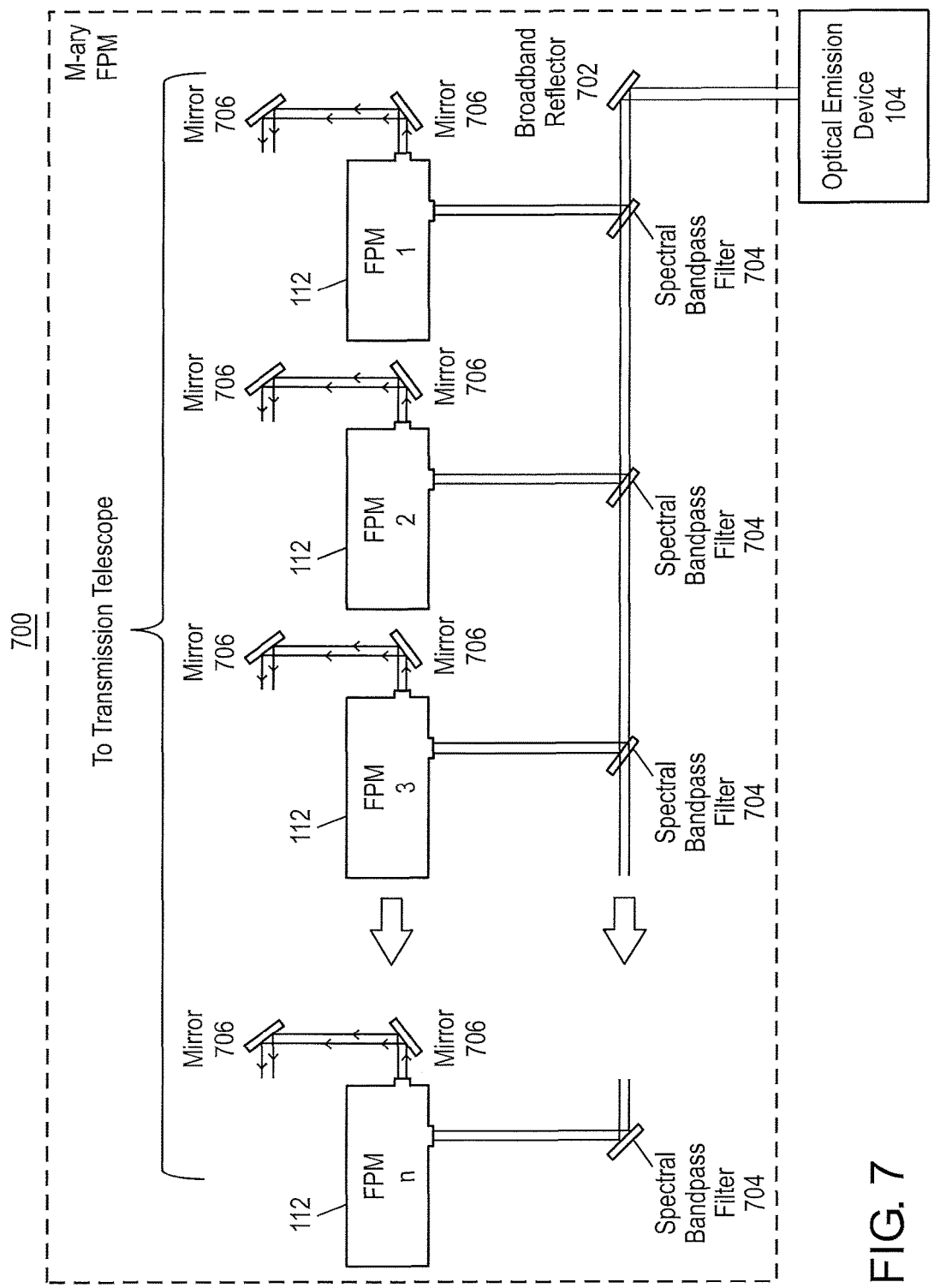
FIG. 7 is a block diagram illustrating a system hardware architecture in accordance with an exemplary embodiment.

The data transmitter 102 also includes a frequency presence modulation unit 112 including at least one optical component having an ultraviolet coating (e.g., ultraviolet grade aluminum or a dielectric coating), the frequency presence modulation unit being configured to spectrally segregate the bandwidth of the at least one communication band into plural channels. That is, the frequency presence modulation unit 112 is used to encode (channelize) data within the pulse emitted by the optical emission device 104. In an exemplary embodiment, a frequency presence modulation unit 112 is used for each band that has been spectrally separated within the bandwidth of the optical emission device 104. For example, if the optical emission device 104 is divided into three 100 nm bands, three frequency presence modulation units 112 can be used to channelize each individual band separately. Each of the three frequency presence modulation units 112 would channelize bands having different frequencies. This is illustrated in FIG. 7, where there are n frequency presence modulation units 112. FIG. 7 shows how the n frequency presence modulation units 112 are connected to the transmission device 114 (e.g., a telescope or any other device that can transmit light) and the optical emission device 104, and will be discussed in further detail later.

Figure 6:
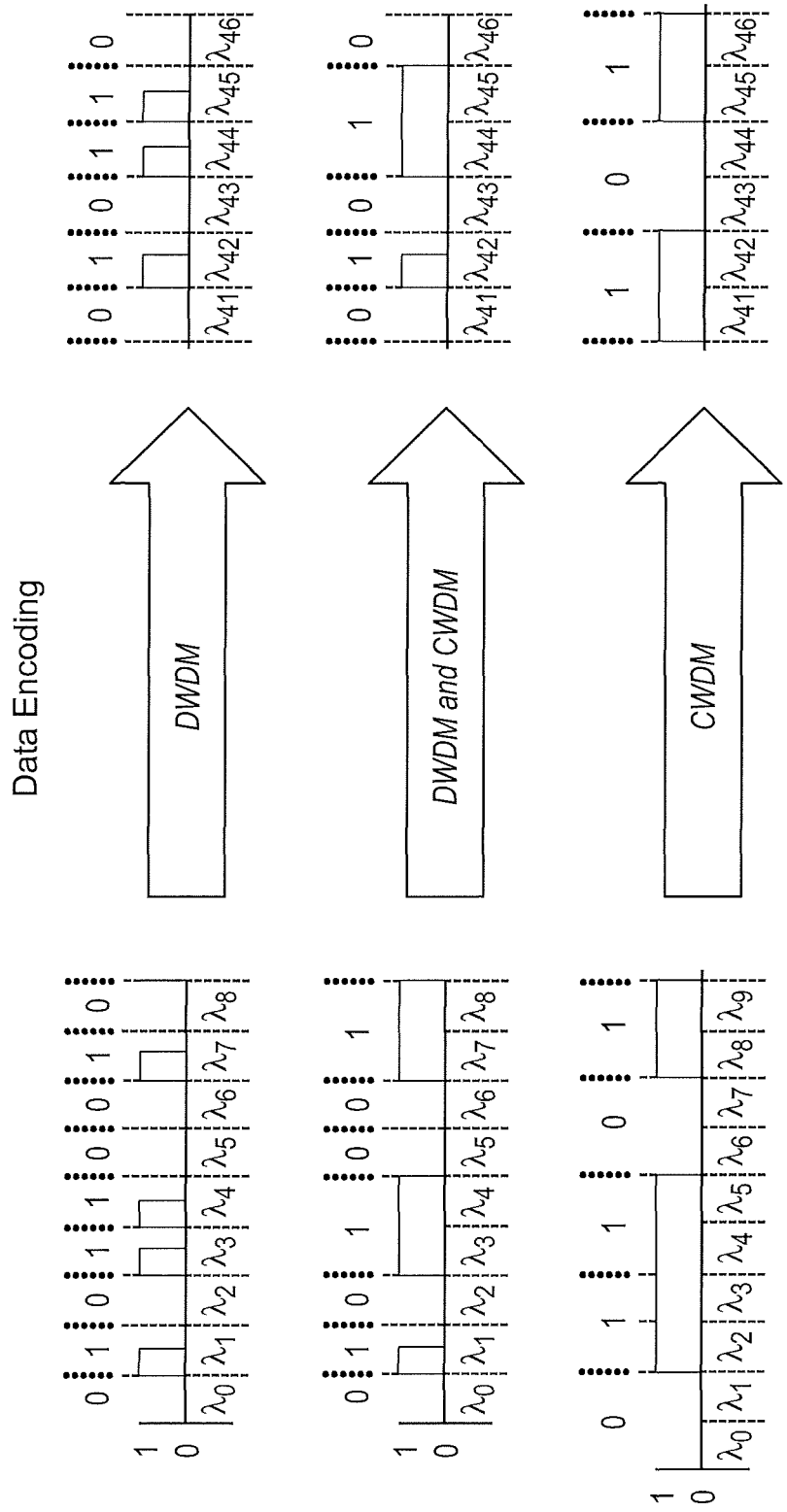
FIG. 6 illustrates data encoding performed in accordance with an exemplary embodiment.

The number of channels per band is adjustable depending on the data rates the optical communication system 102 is built/designed to achieve. For very high data rates (>1 Gbps) per band dense wavelength (bandwidth <2 nm) channelization could be used. For example, the channel bandwidth could be between 1-2 nm, such as 1.8 nm. Coarse wavelength (bandwidth >2 nm) channelization can be used for data rates of 100's of Mbps. For example, the channel bandwidth could be 5 nm. The channels in a band can have the same bandwidth or different bandwidths as shown in FIG. 6. For example, the upper illustration in FIG. 6 is an example of Dense Wave Division Multiplexing (DWDM), and shows all of the channels within one band having the same bandwidth. The lower illustration in FIG. 6 is an example of Coarse Wave Division Multiplexing (CWDM), and shows all of the channels within one band having the same bandwidth. The bandwidth of one channel in the lower illustration of FIG. 6 is approximately twice the bandwidth of one channel in the upper illustration of FIG. 6. The middle illustration in FIG. 6 is an example of both DWDM and CWDM, and at least one channel in the band has a different bandwidth than another channel in the same band. Simultaneous dense and course wavelength channelization enables variable data rates.

The frequency presence modulation unit 112 is also configured to modulate the bandwidth to selectively produce an ultraviolet optical output signal (i.e., the frequency presence modulation output beam) with wavelengths that correspond to one or more of the channels, wherein the presence and absence of energy within channels of the communication band will constitute an information packet for data communication. This is illustrated in FIG. 6, in which the presence of energy within a channel represents a logic 1 value, and the absence of energy in a channel represents a logic 0 value.

Figure 2:
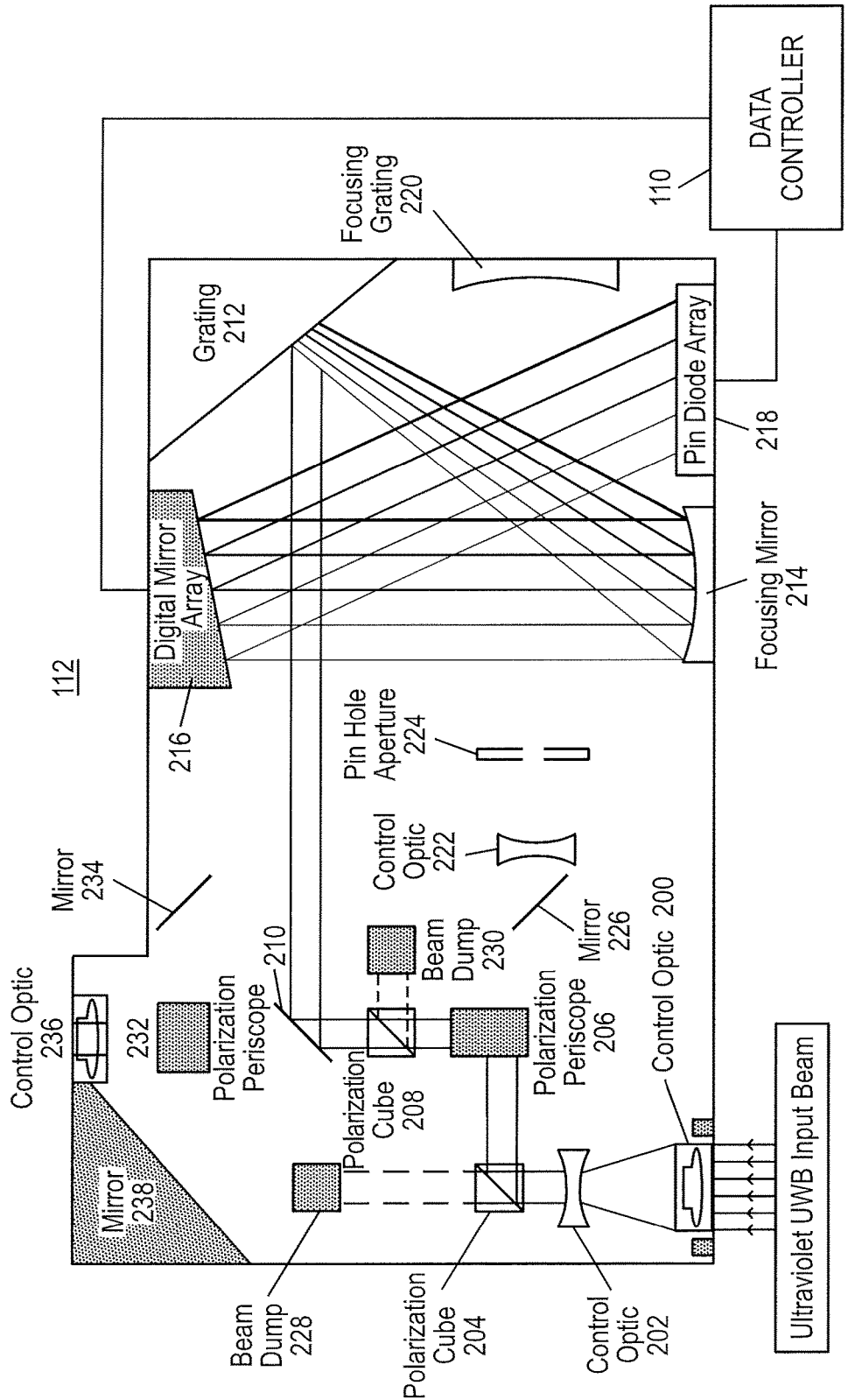
FIG. 2 illustrates a hardware architecture of a frequency presence modulation unit in accordance with an exemplary embodiment.

FIG. 2 is an exemplary embodiment showing the hardware architecture of the frequency presence modulation unit 112 during a code verification sequence, which is a mode in which a beam is not outputted from the frequency presence modulation unit 112 (i.e., a non-transmit mode). In FIG. 2, the frequency presence modulation unit 112 includes plural beam adjustment components that adjust the orientation of an ultraviolet input beam from the beam dividing device 108, and output an adjusted ultraviolet beam. For example, the plural beam adjustment components include a control optic 200, a control optic 202, a polarization cube 204, a polarization periscope 206, a polarization cube 208, a mirror 210, a focusing mirror 214, a focusing grating 220, a control optic 222, a mirror 226, a polarization periscope 232, a mirror 234, a control optic 236, and mirror 238. All or some of the plural beam adjustment components include an ultraviolet coating. In an exemplary embodiment, the plural beam adjustment components include at least one control optic 200, 202, at least one polarization cube 204, 208, and a polarization periscope 206, 232. In an exemplary embodiment, the at least one control optic 200, 202 has a corresponding beam dump device 228, 230 that absorbs unwanted light.

The control optic 200 receives as input the optical beam 106 outputted from the optical emission device 104. The control optic 200 is an input optic for the spectral bandwidth of interest having very high transmission with the spectral bandpass, and very high attenuation of spectral content outside of the spectral bandpass. For example, if the optical emission device 104 is a vertical beam source with a bandwidth from 200 nm to 450 nm, if the frequency presence modulation unit 112 is designed to channelize the band from 200 nm to 300 nm, the control optic 200 would allow light to pass through it in the 200 nm to 300 nm range, and not allow light outside of the 200 nm to 300 nm range into the frequency presence modulation unit 112. The control optic 202 can be used to collimate the beam outputted from the control optic 200. The polarization cube 204 can be a high extinction coefficient (for example, $>10^5$) polarization cube oriented to reflect vertically polarized light. This removes residual horizontal polarized light by transmitting the residual horizontal polarized light to the beam dump 228 (i.e., a photon graveyard) located in line with the polarization cube 204. The polarization periscope 206 is a sequence of mirrors (e.g., two mirrors) which changes the vertical height of the laser beam and also rotates the polarization from vertical to horizontal. The polarization cube 208 can be a high extinction coefficient (for example, $>10^5$) polarization cube oriented to reflect any residual vertically polarized light into the beam dump 230 and transmit the horizontal polarized light onto the mirror 210 which reflects the light onto a grating 212. In an exemplary embodiment, the polarization cubes 204, 208 and the polarization periscopes 206, 232 each have a particular operating range, for example, from 200 nanometers to 500 nanometers. However, the operating range can be any range.

In FIG. 2, the frequency presence modulation unit 112 also includes the grating 212 that receives the adjusted beam from the plural beam adjustment components (e.g., 200, 202, 204, 206, 208, 210, 212, 214, 220, 222, 226, 232, 234, 236, and 238), disperses the spectral content of the adjusted beam, and redirects the dispersed spectral content. The grating 212 used can be specifically designed to operate in a specific wavelength region such as, for example, the ultraviolet region. The frequency presence modulation unit 112 also includes a focusing mirror 214 that receives the dispersed spectral content from the grating 212 and focuses the dispersed spectral content. The focusing mirror 214 is a reflective mirror with an ultraviolet coating that properly disperses (separates) the wavelengths (frequencies) of the spectral band across the digital mirror array 216. The focusing mirror 214 can be, for example, a metallic coated mirror (e.g., ultraviolet grade aluminum), a dielectric coated mirror, etc. Metallic coated mirrors are generally polarization insensitive (i.e., reflectivity does not change) and dielectric coated mirrors are polarization sensitive (reflectivity does change). The type of mirror can be selected based on whether it will be used for vertical polarized light or horizontal polarized light.

The frequency presence modulation unit 112 also includes a digital mirror array 216 that receives the focused and dispersed spectral content from the focusing mirror 214 and performs the spectral segregation of the bandwidth of the at least one communication band into the plural channels by adjusting at least one digital mirror in the digital mirror array 216. The mirrors in the digital mirror array 216 can be controlled electronically so that their angle relative to the incident beam can be changed, which changes the propagation direction of the reflected beam. In an exemplary embodiment, the digital mirror array 216 can be a 1,024× 1,024 array of mirrors. However, it is possible that only a section of the array is controlled by the controller 110. For example, a 3×1,024 section can be controlled so that the refresh rate is optimized. The digital mirror array 216 has a plurality of digital mirrors that each has a reflective coating to reflect ultraviolet light. In an exemplary embodiment, the digital mirror array 216 is configured to perform the spectral segregation of the bandwidth of the at least one communication band into the plural channels and the modulation of the bandwidth to selectively produce the ultraviolet optical output signal with wavelengths that correspond to one or more of the channels.

The frequency presence modulation unit 112 also includes a pin diode array 218 that is used to convert light received onto the array into electrical current that is sent to the controller 110 for verification of the data encoding. In the code verification sequence of FIG. 2, the digital mirrors in the digital mirror array 216 are in the "off" state (i.e., position/angle), and all of the light that is input into the frequency presence modulation unit 112 ends up on the pin diode array 218. That is, light incident on the grating 212 is spectrally dispersed onto the digital mirror array 216, which reflects the light onto the pin diode array 218. The code verification sequence shown in FIG. 2 can detect abnormalities in the components of the frequency presence modulation unit 112, because you expect to receive the same frequencies on the pin diode array 218 as those inputted into the frequency presence modulation unit 112. If this is not the case, the controller 110 can make this determination by comparing the frequencies detected by the pin diode array 218 to the frequencies inputted into the frequency presence modulation unit 112. The non-transmit mode is equivalent to a sequence of zeroes (off states) being transmitted and sequence of ones (on states) being verified.

The frequency presence modulation unit 112 also includes several components that are not used in the code verification sequence of FIG. 2, i.e., a focusing grating/focusing mirror 220, a control optic 222, a pin hole aperture 224, a mirror 226, a polarization periscope 232, a mirror 234, a control optic 236, and a mirror 238. These components will be explained with reference to FIG. 3.

Figure 3:
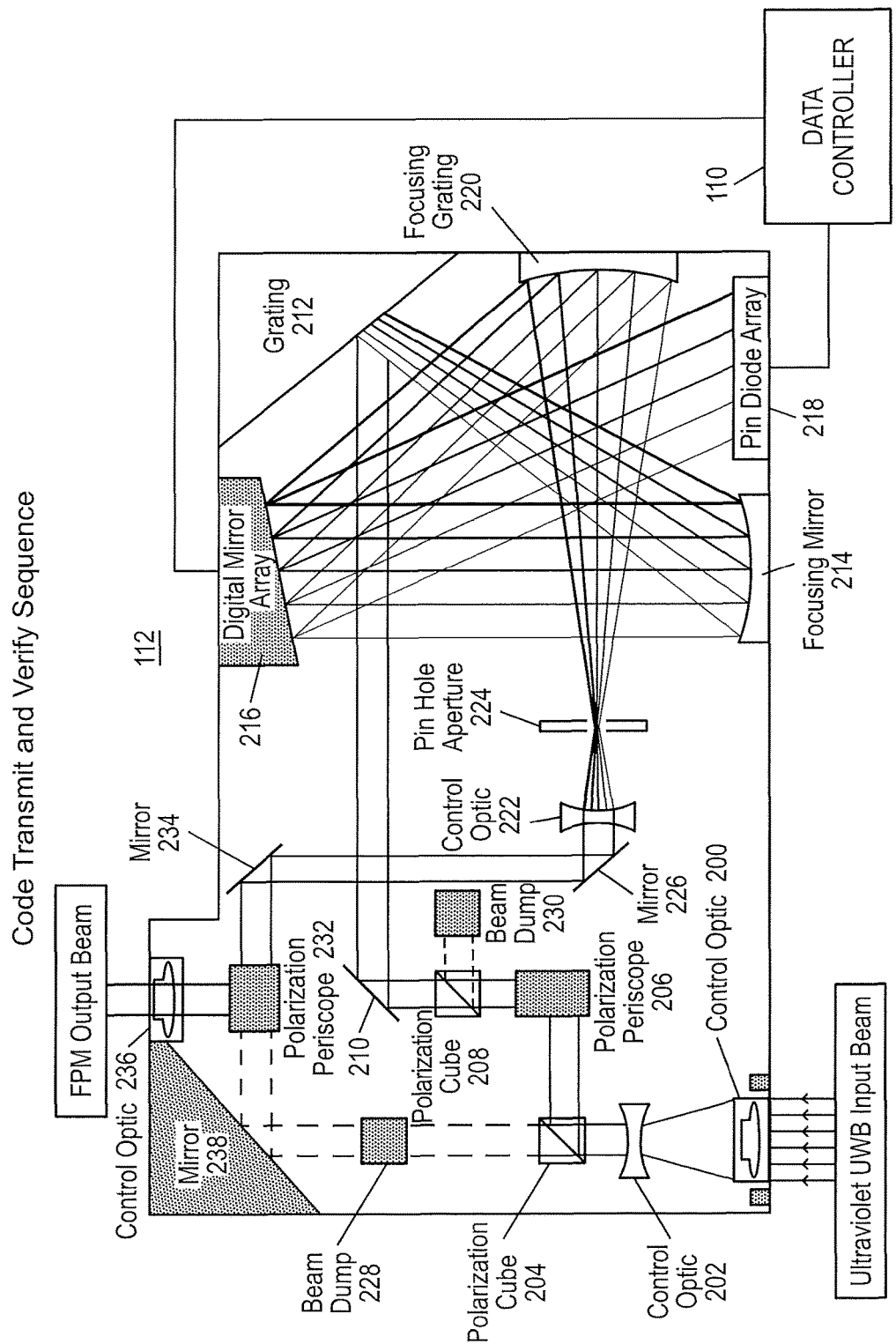
FIG. 3 illustrates a hardware architecture of the frequency presence modulation unit in accordance with an exemplary embodiment.

FIG. 3 is an exemplary embodiment showing the hardware architecture of the frequency presence modulation unit 112 during a code transmit and verify sequence in which channelizing of the pulse occurs. During code transmission and verification, digital mirrors in the digital mirror array 216 are in an active state, and the angle relative to the incident beam is being electronically changed, which changes the propagation direction of the incident beam. In FIG. 3, the components upstream of the focusing mirror 214 function the same as in FIG. 2, i.e. the control optic 200, the control optic 202, the polarization cube 204, the beam dump 228, the polarization periscope 206, the polarization cube 208, the beam dump 230, the mirror 210, the grating 212, and the focusing mirror 214. For data transmission by the frequency presence modulation unit 112, the relative positions of individual mirrors in the digital mirror array 216 are electronically changed, sending certain wavelengths of light within a spectral band onto the focusing grating 220, while other individual mirrors remain in their non-transmit mode position sending certain wavelengths of light within a spectral band onto the pin diode array 218. That is, the focusing grating 220 receives and focuses a first set of wavelengths of the focused and dispersed spectral content reflected by the digital mirror array 216. The first set of wavelengths is ultimately outputted from the frequency presence modulation unit 112 to a transmission device 114 for inclusion in the ultraviolet optical output signal to be transmitted to the data receiver 116. The focusing grating 220 is used to spatially recombine the transmission wavelengths (which were dispersed or separated for data encoding purposes by the grating 212). The dispersion process of the grating 212 leads to spatial and temporal changes in the beam which the focusing grating 212 corrects to maximize the coupling efficiency to the transmission device 114.

The pin diode array 218 receives a second set of wavelengths of the focused and dispersed spectral content reflected from the digital mirror array 216 and converts the second set of wavelengths into electrical current which is sent to the controller 110. The second set of wavelengths received by the pin diode array 218 is not transmitted by the transmission device 114 and is used for data verification. Light incident onto the focusing grating 220 is focused through a pin hole aperture 224 for beam clean-up and onto the control optic 222. The pin hole aperture 224 receives the first set of wavelengths that are reflected from the focusing grating 220. The pin hole aperture 224 insures proper beam quality and is used to maximize the coupling efficiency to the transmission device 114. After the pin hole aperture 224, the beam travels to the control optic 222 which is an optic for collimating the beam after data encoding. That is, control optic 222 collimates a beam outputted from the pin hole aperture 224. The collimation of the beam maximizes the coupling efficiency to the transmission device 114. Next, the transmission beam arrives at a polarization periscope 232 (via mirrors 226 and 234) that performs a polarization rotation of the collimated beam received from the control optic 222. The polarization periscope 232 switches the horizontal beam back to a vertical beam. This removes residual polarized horizontal light which proceeds to the beam dump 228 via a mirror 238. Next, a control optic 236 transmits the rotated and collimated beam to the transmission device 114. The beam reflected through the control optic 236 yields the frequency presence modulation output beam.

The frequency presence modulation unit 112 of FIGS. 2 and 3 has been described above as receiving vertical polarization components, however a frequency presence modulation unit 112 can also be used that receives horizontal polarization components. When pulse energy in a given band is separated into its vertical and horizontal polarization components, the total number of bands available for optical encoding is doubled. A frequency presence modulation unit 112 for horizontal light utilizes the same components as a frequency presence modulation unit for vertical light (i.e., the frequency presence modulation unit 112 in FIGS. 2 and 3), but the relative positions of mirrors, beam dumps, and polarization periscopes are modified. For example, the beam dump 228 could be swapped with the polarization periscope 206. The polarization periscope 206 would be located at a position closer to the polarization cube 204 than the beam dump 228. The mirror 210 would be moved to the left to reflect the horizontally polarized beam onto the grating 212. The polarization cube 208 would be moved forward (i.e., towards the bottom of FIG. 2) and reoriented 90 degrees clockwise to reflect residual vertical polarized light into the beam dump that would not be positioned in the location previously occupied by the polarization cube 208.

As shown in FIG. 1, the data transmitter 102 also includes a controller 110 for providing a control signal to the frequency presence modulation unit 112 to spectrally segregate the bandwidth of the at least one communication band into the plural channels. Specifically, as seen in FIG. 2, the controller 110 provides a control signal to the digital mirror array 216 to segregate the bandwidth of the at least one communication band into the plural channels. The control signal can control the individual mirrors in the array to control whether each mirror is in the transmit position in which certain wavelengths are directed onto the focusing grating or in the non-transmit position in which certain wavelengths are directed onto the pin diode array 218. In an exemplary embodiment, the controller 110 includes a computer processor. The computer processor may be a single hardware processor, a plurality of hardware processors, or combinations thereof. Hardware processor devices may have one or more processor "cores." The controller 110 may be special purpose or general purpose hardware processor devices. The controller 110 may be connected to a communication infrastructure, such as a bus, message queue, network, multi-core message-passing scheme, etc. The network may be any network suitable for performing the functions as disclosed herein and may include a wireless network (e.g., Wi-Fi), a mobile communication network, a satellite network, fiber optic, coaxial cable, infrared, radio frequency (RF), or any combination thereof. Other suitable network types and configurations will be apparent to persons having skill in the relevant art. The controller 110 may also include a memory (e.g., random access memory, read-only memory, etc.). The memory may be read from and/or written to in a well-known manner. In an embodiment, the memory may be non-transitory computer readable recording media. The controller 110 can perform the data verification, or this can be performed in a data verification device 124. The controller 110 operates based on a signal received from a clock and timing device 122. The clock and timing device 122 receives a signal from the optical emission device 104.

Figure 4:
FIG. 4 illustrates a transmitted frequency presence modulation output beam in accordance with an exemplary embodiment.

As shown in FIG. 1, the data transmitter 102 also includes a transmission device 114 configured to transmit the optical output signal to a data receiver 116. An example of the optical output signal is shown in FIG. 4. FIG. 4 shows dense wave division multiplexing and coarse wave division multiplexing within one output beam, which provides a variable data rate. As seen in FIG. 4, the spectral content of certain frequencies is present, and the spectral content of certain frequencies is not present. In an exemplary embodiment, the transmitted output beam can be encrypted. Examples of cryptographic modules/encryption schemes that could be used include: NIST FIPS 140-2, AES 256, Ciena 6500 Flex3 WaveLogic 3e OCLD, Check Point CryptoCore, FIPS Crypto Module by Ionic Security Inc., Tanium Cryptographic Module, etc.

As shown in FIG. 1, the data transmitter 102 also includes a voltage management device 120 and a power management device 118 that are connected to the frequency presence modulation unit 112.

Figure 5:
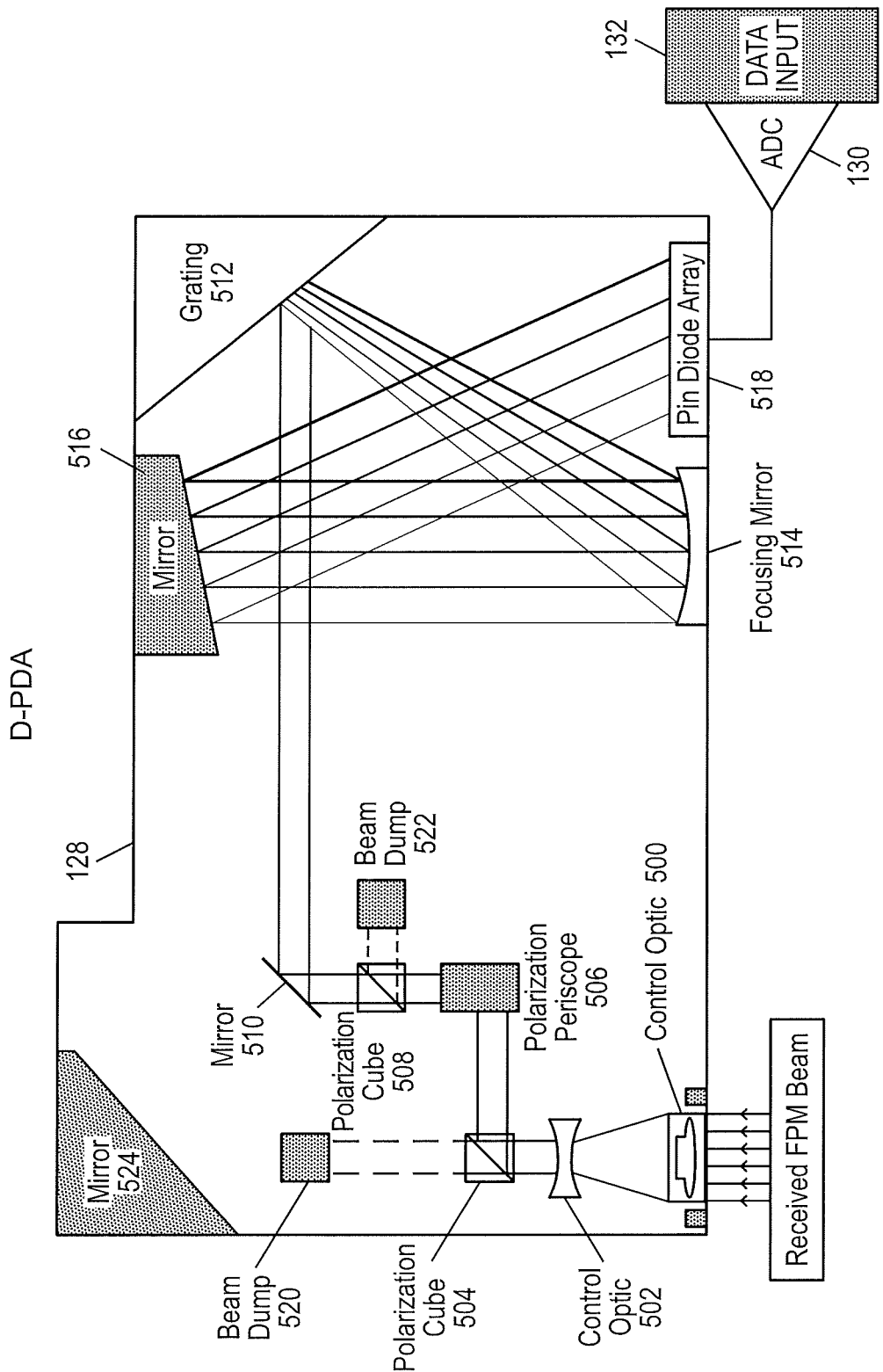
FIG. 5 illustrates a hardware architecture of a receiver in accordance with an exemplary embodiment.

Further details of the components of the data receiver 116 are shown in FIGS. 1 and 5, and are discussed next. As seen in FIG. 1, some of the components present in the data transmitter 102 are also present in the data receiver 116. The data receiver 116 includes a receiving device 126 (e.g., a telescope or any other device to receive an optical beam) to receive the optical output signal (i.e., the frequency presence modulation output beam) transmitted by the transmission device 114. A digital photodiode array (D-PDA) 128 receives a beam output from the receiving device 126. FIG. 5 shows the components of the digital photodiode array 128, some of which are the same or similar to the components of the frequency presence modulation unit 112 of the data transmitter 102. The control optic 500, control optic 502, polarization cube 504, beam dump 520, polarization periscope 506, polarization cube 508, beam dump 522, mirror 510, grating 512, focusing mirror 514, pin diode array 518, and mirror 524 are similar or the same as the control optic 200, control optic 202, polarization cube 204, beam dump 220, polarization periscope 206, polarization cube 208, beam dump 222, mirror 210, grating 212, focusing mirror 214, pin diode array 218, and mirror 238, respectively. In FIG. 5, the mirror 516 can be a fixed mirror with an ultraviolet coating, as all of the light of the spectral band is reflected onto the pin diode array 518 to determine which wavelengths are present. An analog-to-digital converter 130 receives an electrical signal that is outputted from the digital photodiode array 128. Alternatively, the analog-to-digital converter 130 can be replaced with a differential comparator and a digital-to-analog converter. These two components use less power than if the analog-to-digital converter 130 is used, and also facilitates background noise suppression through comparator threshold adjustment. After the digital photodiode array 128, the signal enters a data input device 132 that includes a field programmable gate array. The output of the data input device 132 can be in the Ethernet format, for example. A host processor 134 receives the Ethernet signal, and decodes the received data corresponding to the frequency presence modulation output beam received by the receiving device 126. The host processor 134 is connected to a clock and timing device 138, a voltage management device 140, and a power management device 142. The host processor 134 is connected to a data output device 136 that can be any type of data output section, i.e., firewire, Ethernet, HDMI, toslink, VGA, Wi-Fi, etc. In an exemplary embodiment, the polarization cubes 504, 508 and the polarization periscopes 506 each have a particular operating range, for example, from 200 nanometers to 500 nanometers. However, the operating range can be any range.

An exemplary method performed by the data receiver 116 includes receiving, by the receiving device 126, the ultraviolet optical output signal (e.g., an ultraviolet light beam) transmitted by the transmission device 114. The method also includes receiving, by the digital photodiode array 128, a beam output from the receiving device 126. Next, the method includes receiving, by the analog-to-digital converter 130, an output electrical signal from the digital photodiode array 128.

FIG. 7 shows an array 700 of n frequency presence modulation units 112 and how they are connected to the transmission device 114 and the optical emission device 104. Then frequency presence modulation units 112 each channelize bands having different frequencies. The optical emission device 104 outputs an optical beam that is reflected by a broadband reflector 702, and then the beam is redirected by a spectral bandpass filter 704 that is associated with each of the frequency presence modulation units 112. The beam is routed via a spectral bandpass filter 704 to the associated frequency presence modulation unit 112. The components of each frequency presence modulation unit 112 are the same or similar to those shown in FIGS. 2 and 3. Each frequency presence modulation unit is designed for the particular frequency band it will channelize. The beam outputted by each frequency presence modulation unit 112 is directed by one or more mirrors 706 to the transmission device 114 for transmission. The mirrors 706 and the broadband reflector 702 can have, for example, a reflective coating to reflect ultraviolet light.

Where the present disclosure is implemented using software, the software may be stored in a computer program product or non-transitory computer readable medium and loaded into the controller 110 using a removable storage drive or a communications interface.

Figure 8:
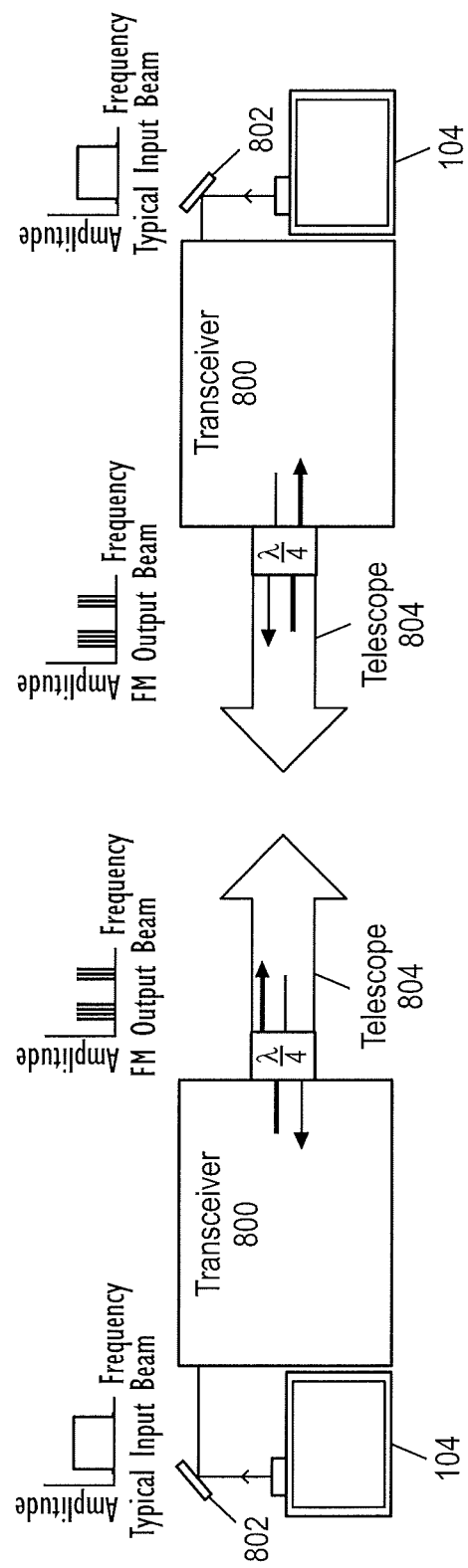
FIG. 8 is a block diagram illustrating a system hardware architecture in accordance with an exemplary embodiment.

FIG. 8 is a block diagram illustrating a system hardware architecture in accordance with an exemplary embodiment.

The system for optical communication in FIG. 8 includes two transceivers 800. Each transceiver 800 has a data transmission section 902 (i.e., a data transmitter) and a data reception section 904 (i.e., a data receiver) (shown in FIG. 9). Each transceiver 800 is connected to the optical emission device 104, a mirror 802, and a transmission device 804 (e.g., a telescope or any other device that can transmit an optical beam). The mirror 802 can have a reflective coating to reflect ultraviolet light. In an exemplary embodiment, the data transmission section 902 of the transceiver 800 includes the same components as the data transmitter 102 in FIGS. 1-3, and these components perform the same functions as described above. In an exemplary embodiment, the data transmission section 902 in the transceiver 800 does not include one or more components included in the data transmitter 102 in FIGS. 1-3, as in FIGS. 10 and 12. In an exemplary embodiment, the data reception section 904 in the transceiver 800 includes the same components as in the data receiver 116 in FIGS. 1 and 5, and these components perform the same functions described above. In an exemplary embodiment, the data reception section 904 in the transceiver 800 does not include one or more components included in the data receiver 116 in FIGS. 1 and 5, as in FIGS. 10 and 12. The transmission device 804 is the same or similar to the transmission device 114 in FIG. 1. The at least one optical emission device 104 is the same or similar to the optical emission device 104 in FIG. 1.

Figure 9:
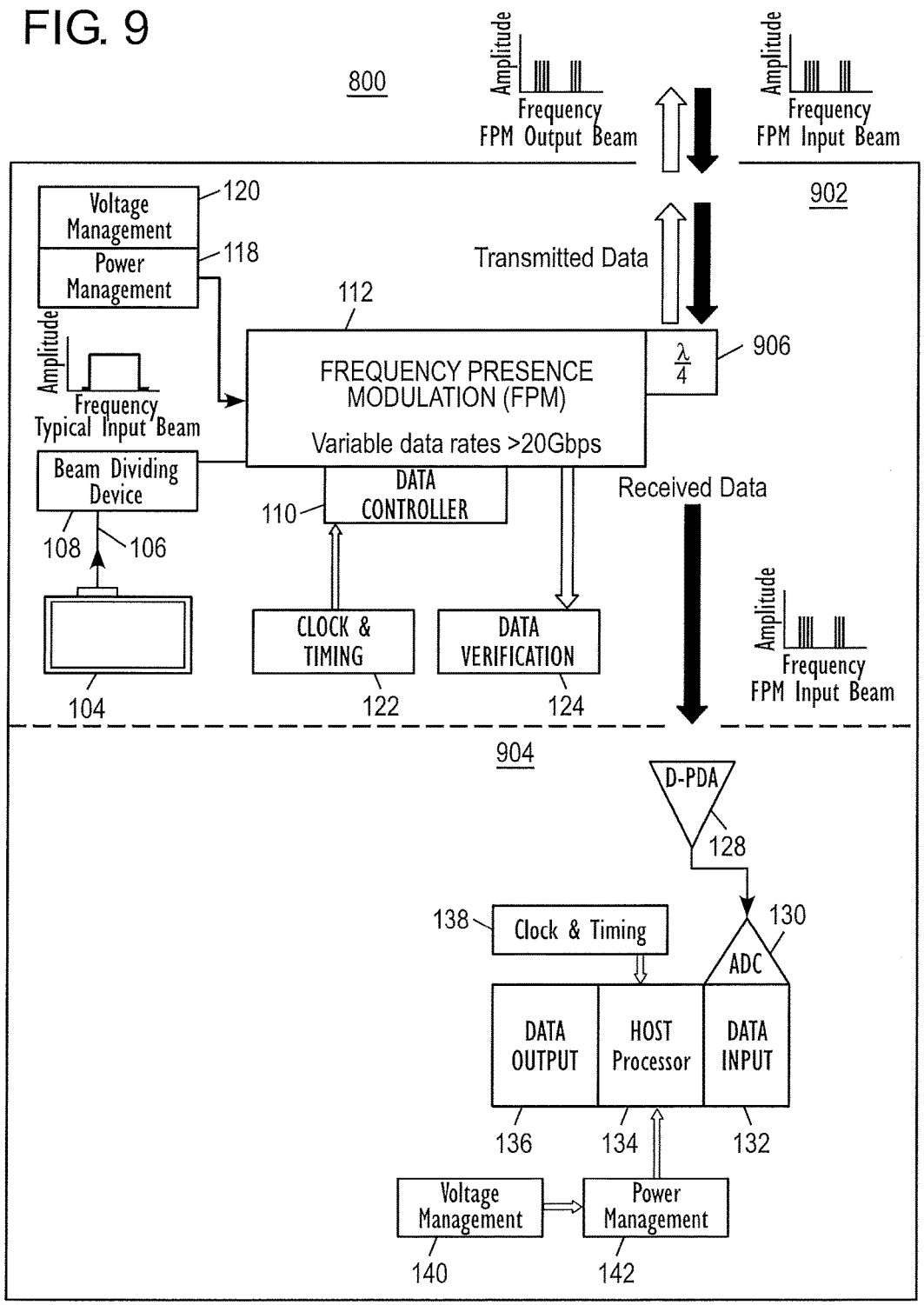
FIG. 9 is a block diagram illustrating a transceiver hardware architecture in accordance with an exemplary embodiment.

FIG. 9 shows the components of the data reception section 904 and the data transmission section 902 of the transceiver 800, and the flow of the transmitted data sent by the transceiver 800, and the flow of the data received by the transceiver 800. In FIG. 9, the data that is inputted into the data transmission section 902 (the optical input signal) can be received by the transmission device 804. The received data passes through the data transmission section 902 and enters the data reception section 904, where it enters the digital photodiode array 128 for processing. In FIG. 9, the data to be transmitted (the optical output signal) is outputted from the frequency presence modulation unit 112 and proceeds to the data transmission section 902. The optical output signal can then proceed to the transmission device 804 for transmission.

Figure 10:
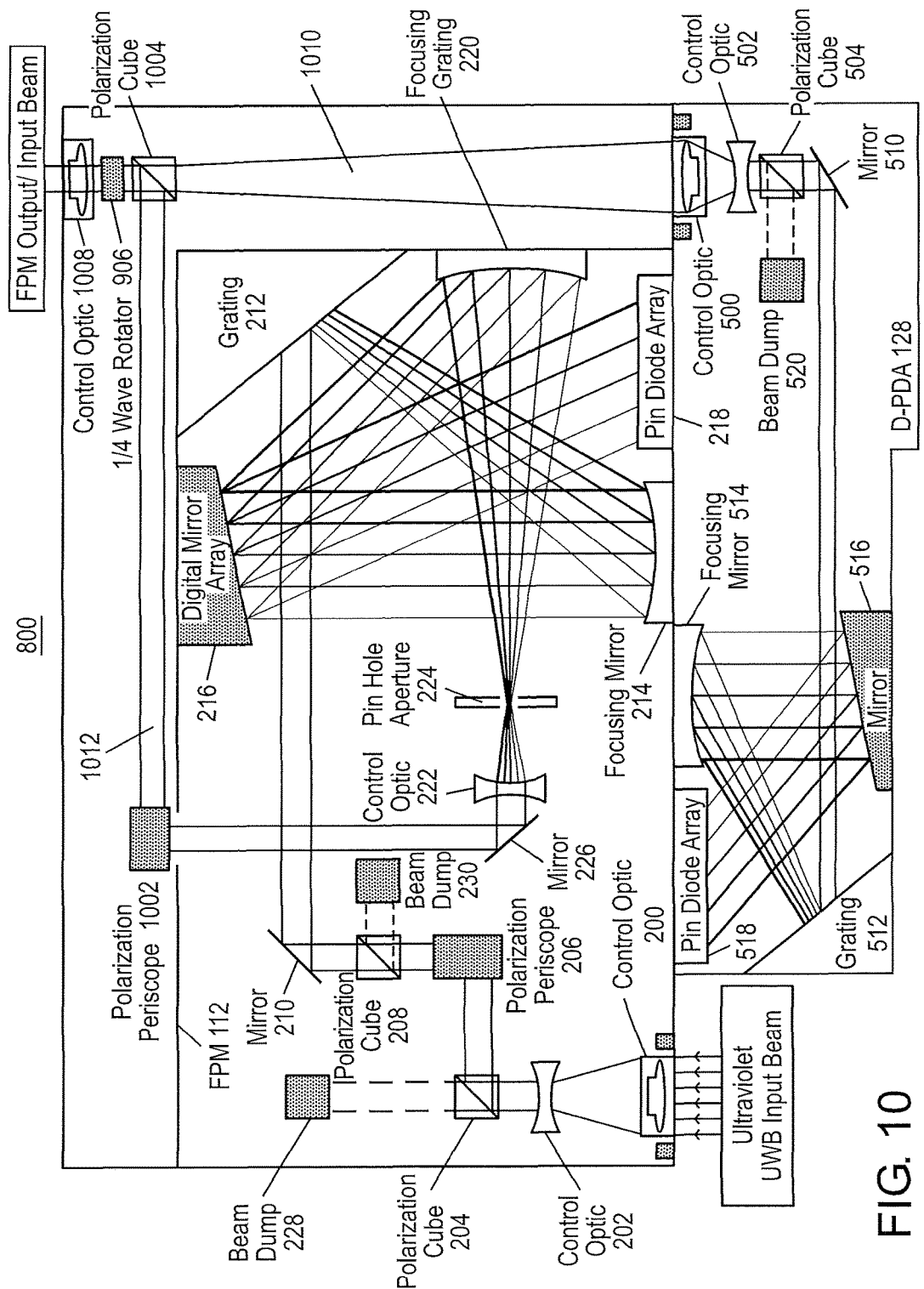
FIG. 10 illustrates a hardware architecture in accordance with an exemplary embodiment.
Figure 12:
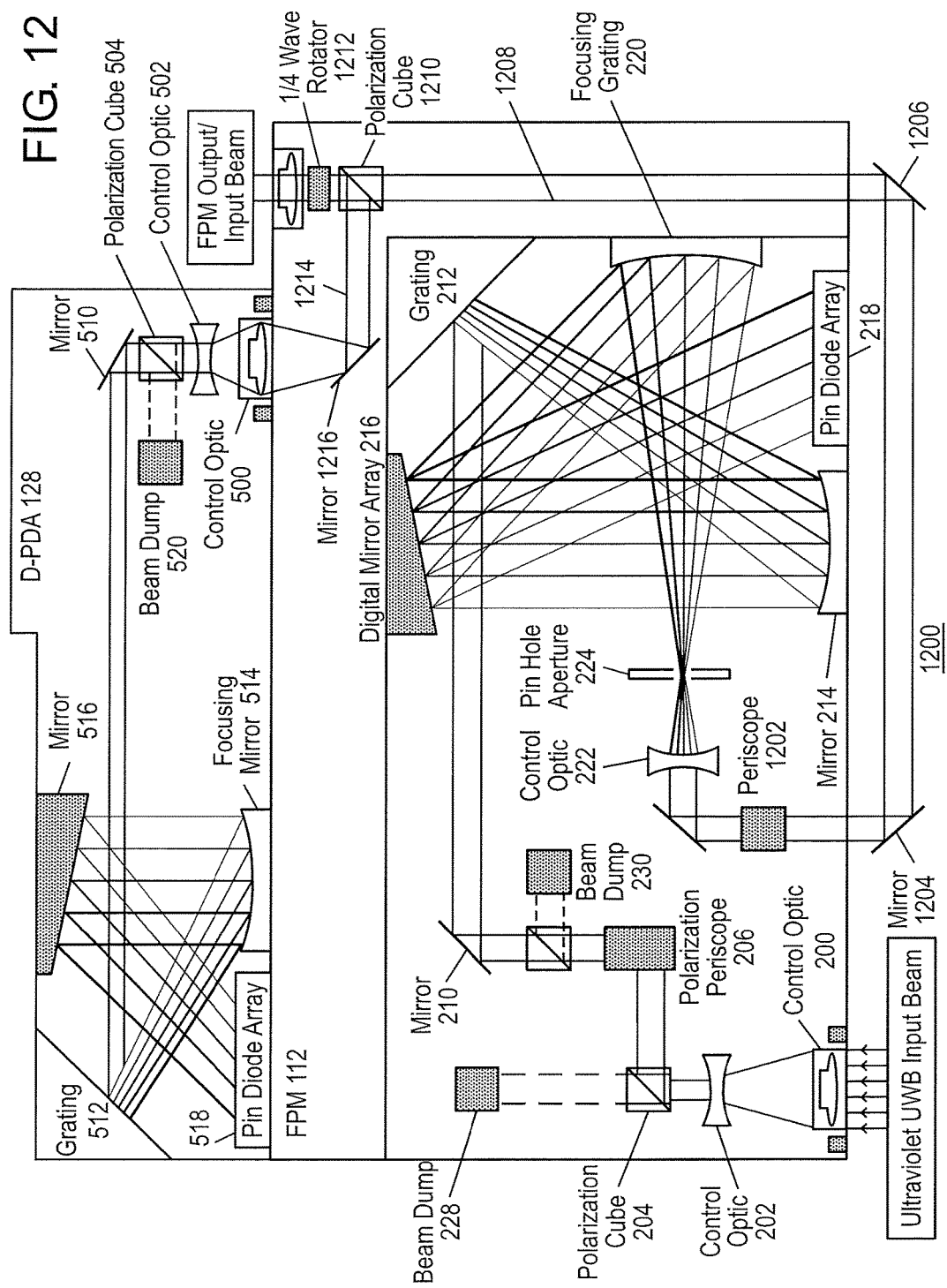
FIG. 12 illustrates a hardware architecture in accordance with an exemplary embodiment.

In an exemplary embodiment, the transmission device 804 is configured to transmit the optical output signal (e.g., an ultraviolet optical output signal) and configured to receive an optical input signal (e.g., an ultraviolet optical input signal). In an exemplary embodiment, the transmission device 804 is configured to transmit the optical output signal and receive an optical input signal simultaneously. FIGS. 10 and 12 show components of the transceiver 800 during simultaneous transmission and reception. The data reception section 904 includes the digital photodiode array 128 shown in greater detail in FIGS. 10 and 12.

As seen in FIG. 10, the transceiver 800 includes, for example, the frequency presence modulation unit 112, the digital photodiode array 128, a polarization periscope 1002, a polarization cube 1004, a quarter wave rotator 906, and a control optic 1008. In an exemplary embodiment, all optical components in the transceiver 800 (e.g., mirrors 210, 226, 510, and 516; focusing mirrors 214 and 514; polarization periscopes 206 and 1002; gratings 212, 220, and 512; polarization cubes 204, 208, 504, and 1004; quarter wave rotator 906; and control optics 200, 202, 222, 500, 502, and 1008) have reflective coatings that reflect ultraviolet light. In an exemplary embodiment, the polarization cube 1004 and the quarter wave rotator 906 can be contained in a housing that is separate from the housing of the transceiver 800. Alternatively, the polarization cube 1004 and the quarter wave rotator 906 can be contained within the housing of the transceiver 800. In an exemplary embodiment, the polarization cubes 1004 and the polarization periscopes 1002 each have a particular operating range, for example, from 200 nanometers to 500 nanometers. However, the operating range can be any range.

Figure 11:
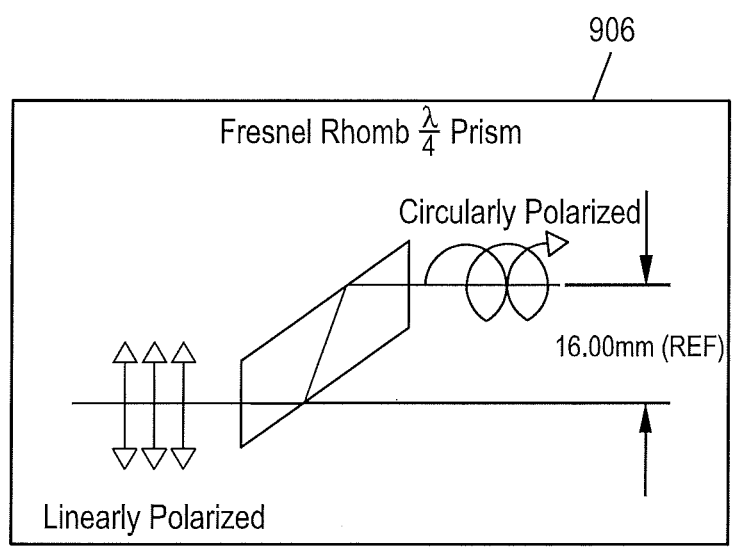
FIG. 11 is a diagram illustrating a quarter wave rotator in accordance with an exemplary embodiment.

In an exemplary embodiment, the ultraviolet optical input signal received by the transmission device 804 is circularly polarized. The circularly polarized ultraviolet optical input signal passes through the control optic 1008 and enters the quarter wave rotator 906. In an exemplary embodiment, the transmission device 804 is not used, and the ultraviolet optical input signal is received by the data transmission section 902 of the transceiver 800 and the ultraviolet optical output signal is transmitted by the data transmission section 902. In FIG. 10, the quarter wave rotator 906 is configured to rotate the circularly polarized ultraviolet optical input signal so it becomes linearly polarized for reception by the data reception section 904, and ultimately for reception by the digital photodiode array 128. For example, in FIG. 10, the quarter wave rotator 906 rotates the circularly polarized ultraviolet optical input signal so it becomes horizontally polarized for reception by the data reception section 904 and the digital photodiode array 128. FIG. 11 shows an exemplary quarter wave rotator 906. In FIG. 11, the quarter wave rotator 906 is a Fresnel Rhomb quarter wave prism that is compatible with ultraviolet light. The Fresnel Rhomb quarter wave prism is used as a broadband polarization rotator, while a quarter wave plate is used as a narrow band polarization rotator. In FIG. 10, the polarization cube 1004 directs the linearly polarized ultraviolet optical input signal (e.g., horizontally polarized ultraviolet optical input signal) to the digital photodiode array 128. For example, the polarization cube 1004 allows the horizontally polarized ultraviolet optical input signal to be transmitted through it and to the data reception section 904 and the digital photodiode array 128. The components of the digital photodiode array 128 process the linearly polarized ultraviolet optical input signal in a similar manner as in FIG. 5 discussed above.

In an exemplary embodiment, as seen in FIG. 10, the digital photodiode array 128 is configured to receive a beam 1010 that is based on the ultraviolet optical input signal (FPM Input Beam shown at the upper right corner of FIG. 10) received from the transmission device 804. The analog-to-digital converter 130 receives an electrical signal outputted from the digital photodiode array 128.

In an exemplary embodiment, the data transmission section 902 includes at least one optical emission device 104 configured to output light energy as an optical beam having an operating bandwidth. The data reception section 904 includes the frequency presence modulation unit 112. The frequency presence modulation unit 112 is configured to spectrally segregate the bandwidth of the at least one communication band into plural channels. The frequency presence modulation unit 112 is also configured to modulate the bandwidth portion to selectively produce an optical output signal with wavelengths that correspond to one or more of the channels. The presence and absence of energy within channels of the communication band will constitute an information packet for data communication.

In an exemplary embodiment, the transceiver 800 includes an optical pathway for bi-directional optical communication over a common optical path for transmitting the ultraviolet optical output signal (produced by the frequency presence modulation unit 112) and for receiving an ultraviolet optical input signal that is received by the data transmission section 902 of the transceiver 800. FIG. 9 shows the common optical path as the area including both the upward and downward pointing arrows and the quarter wave rotator 906. The data reception section 904 is configured to receive the ultraviolet optical input signal from the optical pathway. In an exemplary embodiment, the data reception section 904 includes the digital photodiode array 128 and the analog-to-digital converter 130. The digital photodiode array 128 is configured to receive a beam that is based on the ultraviolet optical input signal received from the optical pathway. The analog-to-digital converter 130 is configured to receive an output electrical signal from the digital photodiode array 128. The transmitter device 804 is connected to the optical pathway and is also configured to receive the ultraviolet optical input signal.

In an exemplary embodiment, the ultraviolet optical output signal produced by the frequency presence modulation unit 112 is linearly polarized. For example, the ultraviolet optical output signal produced by the frequency presence modulation unit 112 is vertically polarized. In FIG. 10, a beam 1012 that exits a polarization periscope 1002 and travels to the polarization cube 1004 is vertically polarized.

In an exemplary embodiment, the polarization cube 1004 directs the linearly polarized (i.e., vertically polarized) ultraviolet optical output signal to the quarter wave rotator 906, and the quarter wave rotator 906 rotates the linearly polarized (i.e., vertically polarized) ultraviolet optical output signal so it becomes a circularly polarized ultraviolet optical output signal for transmission by the transmission device 804. The transmission device 804 transmits the circularly polarized ultraviolet optical output signal. Thus, in FIG. 10, the polarization cube 1004 transmits the horizontally polarized ultraviolet optical input signal received by the transmission device 804, and reflects the vertically polarized ultraviolet optical output signal that is received from the frequency presence modulation unit 112 and is to be transmitted by the transmission device 804.

Similar to FIG. 7, the transceiver 800 can utilize an array of n frequency presence modulation units 112 that are connected to the transmission device 804 and the optical emission device 104. The n frequency presence modulation units 112 each channelize bands having different frequencies.

In an exemplary embodiment, the optical communication system includes a data transmitter (e.g., data transmitter 102 as shown in FIG. 1, data transmitter 902 as shown in FIG. 9, etc.). The data transmitter 102, 902 includes at least one optical emission device 104 configured to output light energy as an optical beam having an operating bandwidth, a beam dividing device 108 arranged to receive and divide the operating bandwidth of the optical beam into bandwidth portions of plural communication bands, a focusing grating 220, and a digital mirror array 216 having a plurality of digital mirrors.

In an exemplary embodiment, the focusing grating 220 is configured to focus all of the wavelengths of the communication band to produce an optical output signal for transmission. For example, the focusing grating 220 focuses all of the wavelengths of the communication band towards the pin hole aperture 224 and onto the control optic 222.

In an exemplary embodiment, the optical communication system includes a transmission device 114 configured to transmit the ultraviolet optical output signal.

In an exemplary embodiment, the optical communication system includes a frequency presence modulation unit 112 that includes the digital mirror array 216 and the focusing grating 220. The frequency presence modulation unit 112 includes plural beam adjustment components (e.g., control optic 202, polarization cube 204, polarization periscope 206, polarization cube 208, mirror 210) that adjust the orientation of an input beam from the beam dividing device 108, and output an adjusted beam (e.g., the beam reflected from the mirror 210 in FIG. 3). The frequency presence modulation unit 112 includes a grating 212 that receives the adjusted beam from the plural beam adjustment components, disperses the spectral content of the adjusted beam, and redirects the dispersed spectral content. Also, the frequency presence modulation unit 112 includes a focusing mirror 214 that receives the dispersed spectral content from the grating 212 and focuses the dispersed spectral content onto the digital mirror array 216. That is, the adjusted beam moves from the grating 212 to the focusing mirror 214, from the focusing mirror 214 to the digital mirror array 216, and from the digital mirror array 216 to the focusing grating 220.

In an exemplary embodiment, each of the plural beam adjustment components, the grating 212, and the focusing grating 220 include an ultraviolet coating. Also, the digital mirror array 216 has a plurality of digital mirrors that each have a reflective ultraviolet coating and the pin diode array 218 includes ultraviolet responsive silicon. In an exemplary embodiment, the grating 212 has an operating range of 200-500 nanometers. However, the operating range of the grating 212 can be any range. In an exemplary embodiment, the digital mirror array is configured to operate at more than one megahertz. In an exemplary embodiment, the digital mirror array 216 is configured to operate at any frequency that is more than 10 kilohertz. The frequency of the digital mirror array 216 can be selected by a user based on the particular application.

In an exemplary embodiment, the optical communication system includes a controller 110 for providing a control signal to the frequency presence modulation unit 112 to control the positions of the plurality of digital mirrors of the digital mirror array 216.

In an exemplary embodiment, the digital mirror array 216 is configured to spectrally segregate a bandwidth portion of at least one communication band into plural channels by adjusting at least one digital mirror in the digital mirror array 216. The digital mirror array 216 is also configured to modulate the bandwidth portion to selectively produce an optical output signal with wavelengths that correspond to one or more of the channels. A presence and absence of energy within channels of the communication band will constitute an information packet for data communication.

In an exemplary embodiment, a transceiver 800 includes the data transmitter 902 discussed above and a data receiver 904.

Figure 13:
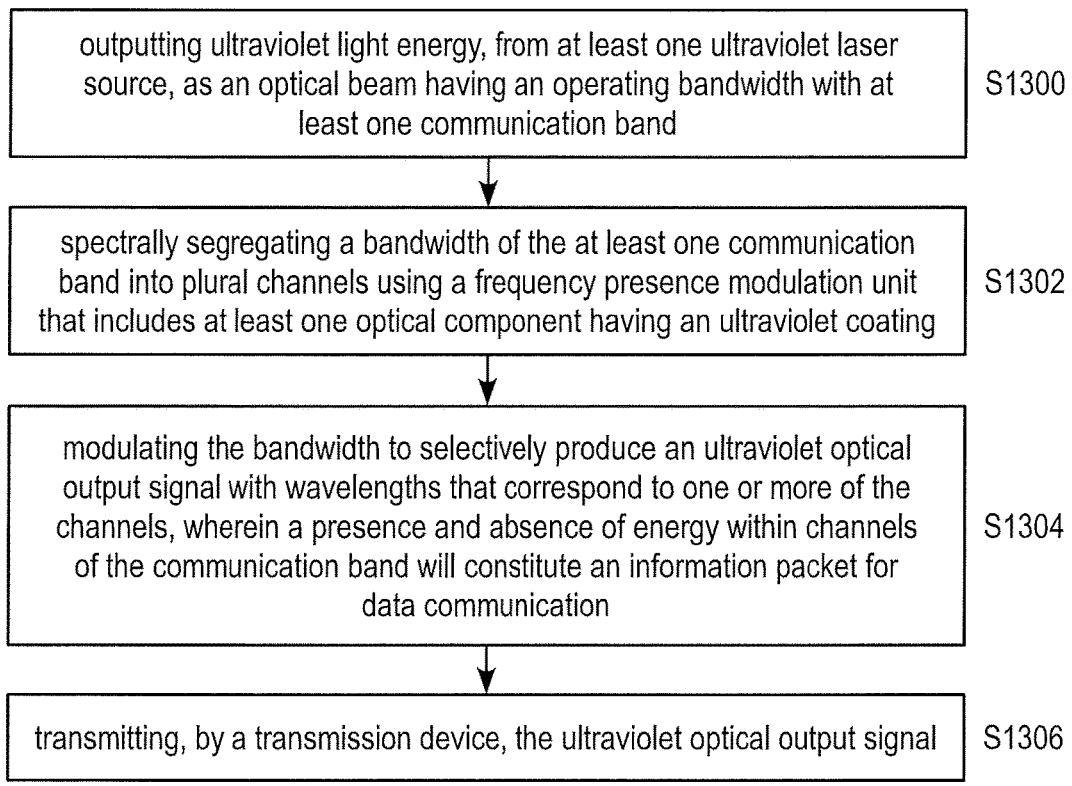
FIG. 13 is a flow chart illustrating a method according to an exemplary embodiment.

FIG. 13 shows an exemplary method for optical communication using the transceiver 800 shown in FIGS. 8-10. This method can also be performed using the transmitter 102 and the receiver 116 shown in FIG. 1. In step S1300, the at least one ultraviolet laser source 104 outputs ultraviolet light energy as an optical beam having an operating bandwidth with at least one communication band. In step S1302, the frequency presence modulation unit 112, that includes at least one optical component having an ultraviolet coating (e.g., the control optic 200, the control optic 202, the polarization cube 204, the polarization periscope 206, the polarization cube 208, the mirror 210, the grating 212, the focusing mirror 214, the focusing grating 220, the digital mirror array 216, the control optic 222, the mirror 226, 234, and 238, and the polarization periscope 232, etc.), spectrally segregates a bandwidth of the at least one communication band into plural channels. In step S1304, the frequency presence modulation unit 112 modulates the bandwidth to selectively produce an ultraviolet optical output signal with wavelengths that correspond to one or more of the channels. The presence and absence of energy within channels of the communication band will constitute an information packet for data communication. In step S1306, the transmission device 804 (or the transmission device 114) transmits the ultraviolet optical output signal.

In an exemplary embodiment, the method includes adjusting, by the plural beam adjustment components, the orientation of an input beam from the beam dividing device 108, and outputting an adjusted beam; and receiving, on a grating 212, the adjusted beam from the plural beam adjustment components. The method also includes dispersing, by the grating 212, the spectral content of the adjusted beam, and redirecting the dispersed spectral content; and receiving, on a focusing mirror 214, the dispersed spectral content from the grating 212 and focusing the dispersed spectral content onto the digital mirror array 216. Further, the method includes receiving, on the digital mirror array 216, the focused and dispersed spectral content from the focusing mirror 214 and performing the spectral segregation of the bandwidth of the at least one communication band into the plural channels by adjusting at least one digital mirror in the digital mirror array 216. Also, the method includes receiving, on the focusing grating 220, a first set of wavelengths of the focused and dispersed spectral content reflected by the digital mirror array 216 and focusing the first set of wavelengths; outputting the first set of wavelengths from the frequency presence modulation unit 112 to the transmission device 114, 804 for inclusion in the ultraviolet optical output signal to be transmitted. The method includes receiving, on the pin diode array 218, a second set of wavelengths of the focused and dispersed spectral content reflected from the digital mirror array 216; converting, by the pin diode array 218, the second set of wavelengths into electrical current; and sending, by the pin diode array 218, the electrical current to the controller 110. The second set of wavelengths received by the pin diode array 218 is not transmitted by the transmission device 114, 804 and is instead used for data verification.

In an exemplary embodiment, each of the plural beam adjustment components, the grating 212, and the focusing grating 220 include an ultraviolet coating. Also, the digital mirror array 216 has a plurality of digital mirrors that each has a reflective ultraviolet coating and the pin diode array 218 includes ultraviolet responsive silicon.

In an exemplary embodiment, the method includes controlling the digital mirror array 216 with a controller 110.

In an exemplary embodiment, the method includes spectrally segregating, by the digital mirror array 216, a bandwidth portion of at least one communication band into plural channels by adjusting at least one digital mirror in the digital mirror array 216. The method also includes modulating, by the digital mirror array 216, the bandwidth portion to selectively produce an optical output signal with wavelengths that correspond to one or more of the channels. A presence and absence of energy within channels of the communication band will constitute an information packet for data communication.

In an exemplary embodiment, the method includes receiving, on a focusing grating 220, a first set of wavelengths of the optical output signal reflected by the digital mirror array 216 and focusing the first set of wavelengths by the focusing grating 220; and outputting the first set of wavelengths to a transmission device 114 for transmission. The method also includes receiving, on a detector 218, a second set of wavelengths from the digital mirror array 216 and converting the second set of wavelengths into electrical current. The second set of wavelengths received by the detector 218 is not transmitted by the transmission device 114 and is used for data verification.

In an exemplary embodiment, each of the plural beam adjustment components, the grating 212, and the focusing grating 220 include an ultraviolet coating. The digital mirror array 216 has a plurality of digital mirrors that each has a reflective ultraviolet coating and the pin diode array 218 includes ultraviolet responsive silicon.

In an exemplary embodiment, the method includes receiving, by the pin hole aperture 224, the first set of wavelengths that are reflected from the focusing grating 220; collimating, by a control optic 222, a beam outputted from the pin hole aperture 224; performing, by a polarization periscope 1202, a polarization rotation of the collimated beam received from the control optic 222; and transmitting, by a second control optic, the rotated and collimated beam to the transmission device 804.

In an exemplary embodiment, the method includes transmitting the ultraviolet optical output signal via the optical pathway for bi-directional optical communication over a common optical path; and receiving an ultraviolet optical input signal via the optical pathway. The method includes receiving, by a data receiver (e.g., the data reception section 904), the ultraviolet optical input signal from the optical pathway; and receiving, by the digital photodiode array 128, a beam that is based on the optical input signal received from the optical pathway. Further, the method includes receiving, by the analog-to-digital converter 130, an output electrical signal from the digital photodiode array 128.

In an exemplary embodiment, the method includes rotating, by a quarter wave rotator 906, a circularly polarized ultraviolet optical input signal received by the optical pathway so it becomes linearly polarized for reception by the data receiver 904; directing, by a polarization cube 1004, the linearly polarized ultraviolet optical input signal to the data receiver 904; directing, by the polarization cube 1004, a linearly polarized ultraviolet optical output signal to the quarter wave rotator 906; and rotating, by the quarter wave rotator 906, the linearly polarized ultraviolet optical output signal so it becomes a circularly polarized ultraviolet optical output signal for transmission.

In an exemplary embodiment, the method includes directing the ultraviolet optical output signal, which is linearly polarized; and receiving, by the quarter wave rotator 906, the linearly polarized ultraviolet optical output signal directed by the polarization cube 1004. The method also includes rotating, by the quarter wave rotator 906, the linearly polarized ultraviolet optical output signal so it becomes a circularly polarized ultraviolet optical output signal for transmission by the transmission device 804.

FIG. 12 shows an exemplary transceiver 1200. In the transceiver 1200, the frequency presence modulation unit 112 and the digital photodiode array 128 are in opposite positions than they were in FIGS. 8-10. In FIG. 12, the optical output signal produced by the frequency presence modulation unit 112 is horizontally polarized. Mirrors 1204 and 1206 direct the horizontally polarized optical output signal to a polarization cube 1210. Thus, a beam 1208 received by the polarization cube 1210 is horizontally polarized. The polarization cube 1210 transmits horizontally polarized beams and reflects vertically polarized beams. The horizontally polarized optical output signal produced by the frequency presence modulation unit 112 is rotated by a quarter wave rotator 1212 to be circularly polarized. The circularly polarized optical output signal is transmitted to the common optical path so it can be transmitted by the transmission device 804.

When the transceiver 1200 receives a circularly polarized optical input signal via the transmission device 804 and the common optical path, the quarter wave rotator 1212 rotates the circularly polarized optical input signal so that it is vertically polarized. The vertically polarized optical input signal that leaves the quarter wave rotator 1212 is received by the polarization cube 1210. The polarization cube 1210 reflects the vertically polarized optical input signal (i.e., beam 1214) to a mirror 1216, which reflects the vertically polarized optical input signal to the digital photodiode array 128, where the signal is processed as above. In an exemplary embodiment, the polarization cube 1210 has a particular operating range, for example, from 200 nanometers to 500 nanometers. However, the operating range can be any range. In an exemplary embodiment, mirrors 1204, 1206, and 1216 each have a reflective coating to reflect ultraviolet light.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. An optical communication system, comprising:
    a data transmitter including:
        at least one ultraviolet laser source configured to output ultraviolet light energy as an optical beam having an operating bandwidth with at least one communication band;
        a frequency presence modulation unit including at least one optical component having an ultraviolet coating, the frequency presence modulation unit being configured to:
            spectrally segregate the bandwidth of the at least one communication band into plural channels, and
            modulate the bandwidth to selectively produce an ultraviolet optical output signal with wavelengths that correspond to one or more of the channels, wherein a presence and absence of energy within channels of the communication band will constitute an information packet for data communication; and
        a controller for providing a control signal to the frequency presence modulation unit to spectrally segregate the bandwidth of the at least one communication band into the plural channels.

2. The optical communication system of claim 1, wherein the at least one ultraviolet laser source is an ultra-wide bandwidth laser.

3. The optical communication system of claim 1, wherein the operating bandwidth of the at least one ultraviolet laser source is anywhere between 200 to 450 nanometers.

4. The optical communication system of claim 1, wherein the at least one ultraviolet laser source has a continuum generation fiber that includes ultraviolet grade sapphire material.

5. The optical communication system of claim 1, wherein the frequency presence modulation unit comprises:
    a digital mirror array having a plurality of digital mirrors that each has a reflective coating to reflect ultraviolet light,
    wherein the digital mirror array is configured to perform the spectral segregation of the bandwidth of the at least one communication band into the plural channels and the modulation of the bandwidth to selectively produce the ultraviolet optical output signal with wavelengths that correspond to one or more of the channels.

6. The optical communication system of claim 1, wherein the frequency presence modulation unit comprises:
    the at least one optical component being plural beam adjustment components adjust the orientation of an input beam from a beam dividing device, and output an adjusted beam;
    a grating that receives the adjusted beam from the plural beam adjustment components, disperses the spectral content of the adjusted beam, and redirects the dispersed spectral content;
    a focusing mirror that receives the dispersed spectral content from the grating and focuses the dispersed spectral content;
    a digital mirror array that receives the focused and dispersed spectral content from the focusing mirror and performs the spectral segregation of the bandwidth of the at least one communication band into the plural channels by adjusting at least one digital mirror in the digital mirror array;
    a focusing grating that receives and focuses a first set of wavelengths of the focused and dispersed spectral content reflected by the digital mirror array, wherein the first set of wavelengths are outputted from the frequency presence modulation unit to a transmission device for inclusion in the ultraviolet optical output signal to be transmitted; and
    a pin diode array that receives a second set of wavelengths of the focused and dispersed spectral content reflected from the digital mirror array and converts the second set of wavelengths into electrical current which is sent to the controller, wherein the second set of wavelengths received by the pin diode array is not transmitted by the transmission device and is used for data verification.

7. The optical communication system of claim 6, wherein each of the plural beam adjustment components, the grating, and the focusing grating include an ultraviolet coating, and wherein the digital mirror array has a plurality of digital mirrors that each has a reflective ultraviolet coating and the pin diode array includes ultraviolet responsive silicon.

8. The optical communication system of claim 7, wherein the ultraviolet coating is ultraviolet grade aluminum or a dielectric coating.

9. The optical communication system of claim 7, wherein the grating has an operating range of 200-500 nanometers.

10. The optical communication system of claim 7, wherein the digital mirror array is configured to operate at more than one megahertz.

11. The optical communication system of claim 6, comprising:
a pin hole aperture that receives the first set of wavelengths that are reflected from the focusing grating;
a control optic that collimates a beam outputted from the pin hole aperture;
a polarization periscope that performs a polarization rotation of the collimated beam received from the control optic; and
a second control optic that transmits the rotated and collimated beam to the transmission device.

12. The optical communication system of claim 6, wherein the plural beam adjustment components comprise:
at least one control optic, at least one polarization cube, and a polarization periscope,
wherein the at least one control optic comprises a corresponding beam dump device that absorbs unwanted light.

13. The optical communication system of claim 1, comprising:
an optical pathway for bi-directional optical communication over a common optical path for transmitting the ultraviolet optical output signal and for receiving an ultraviolet optical input signal; and
a data receiver configured to receive the ultraviolet optical input signal from the optical pathway, wherein the data receiver includes:
a digital photodiode array configured to receive a beam that is based on the ultraviolet optical input signal received from the optical pathway, and
an analog-to-digital converter or a differential comparator and a digital-to-analog converter configured to receive an output electrical signal from the digital photodiode array,
wherein a transmitter device is connected to the optical pathway and is also configured to receive the ultraviolet optical input signal.

14. The optical communication system of claim 13, wherein the optical pathway comprises:
a quarter wave rotator configured to rotate a circularly polarized ultraviolet optical input signal received by the optical pathway so it becomes linearly polarized for reception by the data receiver; and
a polarization cube configured to direct the linearly polarized ultraviolet optical input signal to the data receiver, wherein the polarization cube is configured to direct a linearly polarized ultraviolet optical output signal produced by the frequency presence modulation unit to the quarter wave rotator, and the quarter wave rotator is configured to rotate the linearly polarized ultraviolet optical output signal so it becomes a circularly polarized ultraviolet optical output signal for transmission; or wherein the optical pathway comprises:
a polarization cube configured to direct the ultraviolet optical output signal produced by the frequency presence modulation unit, wherein the ultraviolet optical output signal is linearly polarized; and
a quarter wave rotator configured to receive the linearly polarized ultraviolet optical output signal directed by the polarization cube, and to rotate the linearly polarized ultraviolet optical output signal so it becomes a circularly polarized ultraviolet optical output signal for transmission by the transmission device.

15. A method for optical communication, the method comprising:
outputting ultraviolet light energy, from at least one ultraviolet laser source, as an optical beam having an operating bandwidth with at least one communication band;
spectrally segregating a bandwidth of the at least one communication band into plural channels using a frequency presence modulation unit that includes at least one optical component having an ultraviolet coating;
modulating the bandwidth to selectively produce an ultraviolet optical output signal with wavelengths that correspond to one or more of the channels, wherein a presence and absence of energy within channels of the communication band will constitute an information packet for data communication; and
transmitting, by a transmission device, the ultraviolet optical output signal.

16. The method of claim 15, wherein the at least one ultraviolet laser source is an ultra-wide bandwidth laser.

17. The method of claim 15, wherein the operating bandwidth of the at least one ultraviolet laser source is anywhere between 200 to 450 nanometers.

18. The method of claim 15, wherein the at least one ultraviolet laser source has a continuum generation fiber that includes ultraviolet grade sapphire material.

19. The method of claim 15, wherein the frequency presence modulation unit comprises:
a digital mirror array having a plurality of digital mirrors that each has a reflective ultraviolet coating to reflect ultraviolet light,
wherein the digital mirror array performs the spectral segregation of the bandwidth of the at least one communication band into the plural channels and the modulation of the bandwidth to selectively produce the ultraviolet optical output signal with wavelengths that correspond to one or more of the channels.

20. The method of claim 15, comprising:
adjusting, by plural beam adjustment components, the orientation of an input beam from a beam dividing device, and outputting an adjusted beam;
receiving, on a grating, the adjusted beam from the plural beam adjustment components;
dispersing, by the grating, the spectral content of the adjusted beam, and redirecting the dispersed spectral content;
receiving, on a focusing mirror, the dispersed spectral content from the grating and focusing the dispersed spectral content;
receiving, on a digital mirror array, the focused and dispersed spectral content from the focusing mirror and performing the spectral segregation of the bandwidth of the at least one communication band into the plural channels by adjusting at least one digital mirror in the digital mirror array;

receiving, on a focusing grating, a first set of wavelengths of the focused and dispersed spectral content reflected by the digital mirror array and focusing the first set of wavelengths;

outputting the first set of wavelengths from the frequency presence modulation unit to the transmission device for inclusion in the ultraviolet optical output signal to be transmitted;

receiving, on a pin diode array, a second set of wavelengths of the focused and dispersed spectral content reflected from the digital mirror array;

converting, by the pin diode array, the second set of wavelengths into electrical current; and sending, by the pin diode array, the electrical current to the controller, wherein the second set of wavelengths received by the pin diode array is not transmitted by the transmission device and is used for data verification.

21. The method of claim 20, wherein each of the plural beam adjustment components, the grating, and the focusing grating include an ultraviolet coating, and wherein the digital mirror array has a plurality of digital mirrors that each has a reflective ultraviolet coating and the pin diode array includes ultraviolet responsive silicon.

22. The method of claim 21, wherein the ultraviolet coating is ultraviolet grade aluminum or a dielectric coating.

23. The method of claim 21, wherein the grating has an operating range of 200-500 nanometers.

24. The method of claim 21, wherein the digital mirror array operates at more than one megahertz.

25. The method of claim 20, comprising:

receiving, by a pin hole aperture, the first set of wavelengths that are reflected from the focusing grating;

collimating, by a control optic, a beam outputted from the pin hole aperture;

performing, by a polarization periscope, a polarization rotation of the collimated beam received from the control optic; and transmitting, by a second control optic, the rotated and collimated beam to the transmission device.

26. The method of claim 15, comprising:

transmitting the ultraviolet optical output signal via an optical pathway for bi-directional optical communication over a common optical path;

receiving an ultraviolet optical input signal via the optical pathway;

receiving, by a data receiver, the ultraviolet optical input signal from the optical pathway;

receiving, by a digital photodiode array, a beam that is based on the optical input signal received from the optical pathway; and receiving, by an analog-to-digital converter, an output electrical signal from the digital photodiode array, wherein the transmission device is connected to the optical pathway and is also configured to receive the ultraviolet optical input signal.

27. The method of claim 26, comprising:

rotating, by a quarter wave rotator, a circularly polarized ultraviolet optical input signal received by the optical pathway so it becomes linearly polarized for reception by the data receiver, directing, by a polarization cube, the linearly polarized ultraviolet optical input signal to the data receiver, directing, by the polarization cube, a linearly polarized ultraviolet optical output signal to the quarter wave rotator, and rotating, by the quarter wave rotator, the linearly polarized ultraviolet optical output signal so it becomes a circularly polarized ultraviolet optical output signal for transmission; or directing the ultraviolet optical output signal, wherein the ultraviolet optical output signal is linearly polarized, receiving, by a quarter wave rotator, the linearly polarized ultraviolet optical output signal directed by the polarization cube, and rotating, by the quarter wave rotator, the linearly polarized ultraviolet optical output signal so it becomes a circularly polarized ultraviolet optical output signal for transmission by the transmission device.

* * * * *